United States Patent [19]

Moreau et al.

[11] Patent Number: 5,655,464
[45] Date of Patent: Aug. 12, 1997

[54] APPARATUS FOR MELTING GLASS

[75] Inventors: Raymond Moreau, Croissy sur Seine; Roger Gobert, Feucherolles; Pierre Jeanvoine, rue de Chambourey, all of France

[73] Assignee: Saint-Gobain Vitrage, Courbevoie, France

[21] Appl. No.: 332,036

[22] Filed: Nov. 1, 1994

[30] Foreign Application Priority Data

Nov. 2, 1993 [FR] France ................... 93 13021

[51] Int. Cl.$^6$ ............... F23M 5/06; C03B 5/16
[52] U.S. Cl. ............ 110/335; 110/339; 65/134.4; 65/135.1; 65/135.9; 65/136.1; 65/136.2
[58] Field of Search ................ 65/134.1, 135.7, 65/135.8, 135.1, 157, 182.3, 134.4, 134.7, 135.9, 136.1, 136.2; 110/335, 339, 345, 347

[56] References Cited

U.S. PATENT DOCUMENTS

| 4,001,001 | 1/1977 | Knavish et al. |
| 4,029,489 | 6/1977 | Froberg et al. |
| 4,432,780 | 2/1984 | Propster et al. |
| 5,417,732 | 5/1995 | Shamp et al. ................ 65/335 |

FOREIGN PATENT DOCUMENTS

| 0 426 082 | 5/1991 | European Pat. Off. |
| 0 532 825 | 3/1993 | European Pat. Off. |
| 2603561 | 8/1976 | Germany. |
| 3836763 | 5/1990 | Germany. |

OTHER PUBLICATIONS

"Oxy–Fuel Firing For Emissions Control on a Fiberglass Melter", Glass Industry, vol. 74, No. 11, Oct. 10, 1993, New York, pp. 18–22.

Primary Examiner—David A. Redding
Attorney, Agent, or Firm—Oblon, Spivak, McClelland, Maier & Neustadt, P.C.

[57] ABSTRACT

A furnace for melting vitrifiable materials having a compartment (1) for the melting/refining of the glass and which is provided in its upstream part with at least one opening (12) to be supplied with vitrifiable materials (10) with the aid of a charging device positioned facing and in the downstream part a discharge opening (17) for the molten glass issuing into one or more successive, downstream compartments (18, 19) for leading the molten glass to the forming zone. The melting of the vitrifiable materials takes place in the melting/refining compartment (1) essentially via a plurality of burners (16) with an oxidizer constituted by oxygen. It is designed to operate without any air introduction into the melting/refining compartment (1) coming from the downstream compartment or compartments.

16 Claims, 4 Drawing Sheets

FIG_1

FIG_2

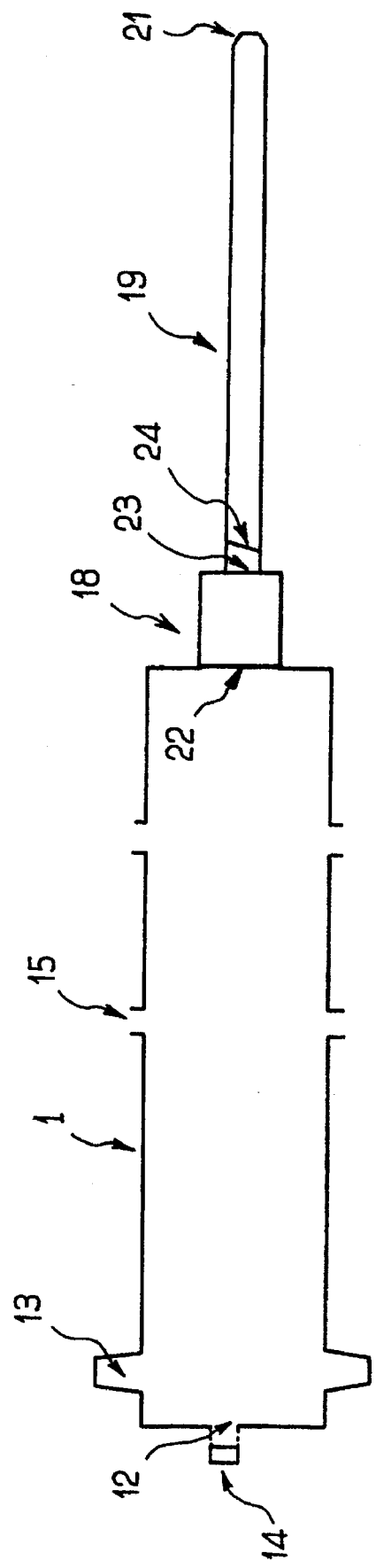
FIG._4

APPARATUS FOR MELTING GLASS

BACKGROUND OF THE INVENTION

1. Field of the Invention

The invention relates to an apparatus for melting and refining glass from vitrifiable materials, more commonly called a melting furnace, with a view to the continuous supply of molten glass to forming installations, either for flat glass such as in rolling or float installations, or for hollow glass such as a plurality of forming machines.

The invention is more particularly directed at melting furnaces for flat glass with high molten glass production capacity levels which can, e.g., represent melting rates or outputs of at least 10 tonnes/day and can even reach 1000 and more tonnes/day. However, it is also advantageous for smaller furnaces.

2. Background of the Related Art

In known manner, such a furnace is generally broken down into a succession of compartments issuing into one another and each having specific functions and dimensions. The furnace must be able to melt vitrifiable materials and guarantee the chemical and thermal homogeneity of the glass when malted.

EP-B-264 327 discloses a melting furnace structure having a first compartment in which melting and refining of the glass-making composition takes place, followed by a second compartment forming a neck. The neck issues into a compartment in which thermal homogenization of the molten glass takes place and which is known as a conditioner. The conditioner issues into a flow channel having a significantly reduced section size, which discharges the molten glass to a forming installation.

Furnaces can be placed in two major categories as a function of the heating means used for melting the vitrifiable materials in the melting compartment.

On the one hand there are electric melting furnaces of the so-called cold top type, such as is e.g. known from EP-B-304 371, where melting taken place by electrodes immersed in the depth of the molten glass.

There are also fired furnaces, also known as regenerative furnaces, such as are known from U.S. Pat. No. 4,599,100. In this case, the heating power is supplied by two rows of burners generally operating with a fuel-air mixture and arranged in alternating manner. The combustion gases then alternately heat one or other of two regenerators positioned in facing manner on either side of the melting compartment and communicating therewith. The combustion gases are thermally extracted through stacks of refractories, which constitute the regenerators and which then restore the heat to the melting compartment.

This heating method is effective and widely used. But it suffers from a certain number of disadvantages inherent therein. For example, the energy costs of the fuel-air burners are relatively high. Moreover, the operating system of the burners, which are activated in an alternating manner with cycles of approximately 20 to 30 minutes, is not easy to strictly control. Their use also leads to the introduction into the melting compartment of a significant quantity of air and therefore nitrogen, which leads to an increased risk of forming polluting gases of the $NO_x$ type, which must then be treated.

Finally, the large amount of special, costly refractories necessary for the manufacture of the regenerators significantly increases the furnace construction costs.

SUMMARY OF THE INVENTION

An object of the invention is to obviate the disadvantages associated with the use of fired furnaces by proposing a new flame heating type, which greatly reduces the energy costs and the furnace construction material costs, which simplifies its operating procedure and at the same time guarantees the obtaining of a molten glass of an at least equivalent quantity.

The invention is directed to a furnace for melting vitrifiable materials, which has a melting/refining compartment for the glass and which is provided in its upstream part with at least one opening to be supplied with vitrifiable materials via charging devices positioned in front of said openings. In the downstream part, said melting/refining compartment has at least one discharge opening for the molten glass issuing into one or more successive downstream compartments for leading the molten glass to the forming or shaping zone. According to the invention, melting of the vitrifiable materials in the melting/refining compartment is provided by a plurality of burners using an oxidizer essentially constituted by oxygen.

In addition, the furnace is designed in such a way that there is no air supply into the melting and refining compartment, especially from the downstream compartment or compartments and/or from upstream of the melting compartment, e.g., from the vitrifiable material charging zone if the melting compartment is preceded by a preheating compartment for the vitrifiable materials issuing into the latter. To prevent any arrival or supply of air, the furnace can advantageously be equipped with at least one means for making it gas tight, particularly between the melting/refining compartment and the downstream compartment or compartments.

Within the scope of the present invention, the terms "upstream" and "downstream" refer to the overall flow direction of the molten glass through the furnace.

The choice of a heating procedure using burners operating with oxygen leads to a number of advantages compared with more conventional burners, more particularly as compared to operating with an oxidizer of the air type.

This heating procedure firstly makes it possible to abandon the traditional "inversion" operation of fired furnaces. Thus, oxygen burners can operate continuously, which makes the use of the furnace simpler, said continuous operation being more regular and allowing finer settings than in the case of inversion operation. In particular, it is possible to completely eliminate the presence of regenerators formed from stacks of expensive refractories which are subject to wear. Therefore oxygen burners are able to heat the roof, top or arch of the melting/refining compartment and the so-called laboratory volume between said top and the level of the molten glass, in a continuous manner and without having recourse to regenerators.

The atmosphere prevailing above the glass level in the melting/refining compartment is much more stable and controlled, which can be important for the production of so-called special glasses.

Moreover, the thermal efficiency of such burners is much higher than that of conventional burners operating with an oxidizer of the air type, due to the absence of nitrogen, which considerably reduces the volume of fumes generated. Thus, there are considerable energy cost reductions, and this type of burner makes it possible to significantly increase the specific output of the furnace.

The fact that the burners chosen according to the invention require introducing a very small or zero air quantity into the melting/refining compartment significantly reduces the possibilities of the formation of polluting gases of the $NO_x$ type, which greatly reduces the treatment costs for the combustion gases discharged out of the compartment.

Moreover, compared with conventional burners, oxygen burners make it possible to introduce into the melting/refining compartment a much larger oxidant volume and the gas volume resulting from combustion is greatly reduced, as indicated hereinbefore. This means that it is possible to reduce the so-called laboratory volume, e.g., by lowering the top of the melting/refining compartment, which in turn tends to reduce both the energy costs and the furnace construction costs.

The use of oxygen burners operating without inversion also leads to the obtaining of a furnace which is more reliable, less costly in its design and which permits energy economies which can extend well beyond 15% compared with a conventionally fired furnace having similar dimensions.

However, this very favorable balance would be compromised if, contrary to the invention, air were to enter into the melting/refining compartment, notably from downstream compartments. There would also be a risk of again creating a certain quantity of polluting gases of the $NO_x$ type in the melting/refining compartment and there would be a significant decrease in the energy economies of said compartment. This intake of air can be prevented by providing means for bringing about a gas seal of the melting/refining compartment with respect to the remainder of the furnace. Said sealing means therefore insulates the atmosphere prevailing above the molten glass in the melting/refining compartment from the atmosphere of the successive, downstream compartment or compartments adjacent thereto. These downstream compartments serve to condition the glass, i.e., to progressively cool it so that it reaches its forming or shaping temperature, perfect its chemical and thermal homogeneity and eliminate therefrom foreign bodies such as batch stones or refractory material particles. This thermal conditioning can take place in one or other of said downstream compartments in a known manner by the alternate or combined use of reheating means, e.g., conventional fuel-air burners, and cooling means introducing large amounts of air at ambient temperature into said compartments. It is therefore necessary to prevent such gases from coming back towards the melting/refining compartment, so that they do not disturb its highly controlled atmosphere.

It is obvious that if the downstream compartment or compartments are designed in a known manner, e.g., using cooling means without air introduction and having an atmosphere not constituted by gas, said sealing means are no longer indispensable.

In the melting/refining compartment, the oxygen burners according to the invention (this expression meaning that the oxidizer used is oxygen) are positioned heightwise and optionally at an adequate height, compared with the glass level, so that the flames from the burners do not come into direct contact with the surface of the glass.

These burners are preferably distributed in rows substantially parallel to the longitudinal axis of the melting/refining compartment. The simplest distribution consists of providing two rows of burners issuing into the melting/refining compartment through its side walls. For this purpose, the openings to be made in the wall have a very reduced section and consequently do not disturb the overall thermal insulation of the compartment. The best possible procedure is to combine the burners into a plurality of groups, whose heating power is regulated autonomously between the individual groups. These groups are preferably arranged successively and transversely with respect to the longitudinal axis of the compartment. Therefore heating is modulated and regulated in an optimum manner all along the compartment, and it is possible to create there all desired temperature profiles, particularly in accordance with the type of molten glass to be produced.

In the melting/refining compartment, it is possible to provide auxiliary heating means, e.g., in the form of electrodes immersed in the depth of the glass, in order to adjust or correct the temperature profile in the compartment.

Since the melting/refining compartment has no regenerators, its thermal insulation with respect to the outside is both better and easier to implement. The walls, particularly the side walls and top, can therefore be insulated in a reinforced manner by planar, simply geometrically shaped panels made from a fibrous insulating material and/or sprayed insulating concrete, and whose thickness is sufficiently small to give good accessibility to the side walls. This ease of access facilitates the modifications of the furnace between two glass production campaigns.

In order to thermally extract in an optimum manner the combustion fumes, the walls of said melting/refining compartment are provided with discharge openings in the vicinity of the vitrifiable material supply openings in the most upstream zone of the melting/refining compartment. These discharge openings are preferably positioned in the vicinity of said supply openings. Therefore the fumes can follow a counterflow path from the downstream part to the upstream part of the compartment, so that they are carried above the zone in which the vitrifiable materials float on the surface, and therefore aid the melting thereof. In order to optimize this thermal extraction of the combustion fumes, it is preferable to protect the furthest upstream part of the melting/refining compartment where the vitrifiable materials are charged from the radiation of the burner flames, e.g., with a heat shield of the shadow wall or drop arch type, and ensure that said zone contains no burners. Otherwise there would be a risk in said zone of reheating the fumes, whose temperature it is wished to lower to the greatest possible extent prior to discharge in order to transfer in the optimum possible way their heat to the supernatant, vitrifiable materials. The heat shield also facilitates the convergence of the fumes towards said vitrifiable materials.

In this connection, the invention also relates to a process for preheating a vitrifiable material composition in a furnace for melting said composition and which consists of passing the combustion fumes emitted in the melting compartment of the furnace and in particular the above-described furnace, above the vitrifiable material composition floating on the surface of the already melting phase.

Two different positions can be adopted for the vitrifiable materials supply opening or openings located in the upstream part of the melting/refining compartment. They can be made in the front wall of the compartment or in at least one of its two side walls.

In the latter case, the most advantageous embodiment consists of providing two symmetrical openings facing one another in the side walls and two types of front or side openings permitting an effective charging of vitrifiable materials. However, it would appear that the charging of vitrifiable material through side openings makes the charging operation simpler and more flexible and in particular makes it possible to increase the heat exchange surfaces between the supernatant, vitrifiable materials and the combustion fumes. Various, known charging devices can be used, such as pusher, slide and shovel devices, which may or may not be of an oscillating nature.

It is also possible to provide auxiliary discharge openings for fumes in the side walls of the melting/refining compartment. On leaving the compartment said fumes can still be relatively hot. It is for this reason that they are to be transferred into heat recovery devices of the boiler type or preheating devices for the vitrifiable materials prior to the charging of the latter, or into any other heat recovery device.

Various means for rendering the melting/refining compartment tight or sealed with respect to gases can be provided, which are arranged either singly or in succession, so as to protect the atmosphere of the melting/refining compartment. It is obvious that the larger the number of such means and/or the higher their efficiency, the more it is possible to guarantee the complete insulation of the compartment. These means are, e.g., in the form of a suspended shield and/or a dam partly submerged in the depths of the molten glass. Each of these means has its own special structural nature, although all are generally placed in a substantially vertical plane. Thus, a suspended shield is generally designed in such a way as to be flush with the surface of the glass. If the submerged dam starts from the top and penetrates by a significant depth into the thickness of the glass, it offers a total barrier with respect to the gases. However, it is subject to manufacturing constraints which may limit its use to zones having a relatively reduced section.

With respect to the location of said sealing means, advantageously they are placed at the junction between the melting/refining compartment and the downstream compartment adjacent thereto and/or at the junction between two adjacent downstream compartments and/or in one of the said downstream compartments in the vicinity of one or other of said junctions.

Advantageously the dimensions and in particular the length of the melting/refining compartment are chosen in such a way as to maintain within the molten mass in said compartment the presence of two convective circulation loops.

Preferably, the overall structure of the furnace is broken down into the aforementioned melting/refining compartment, which issues into a first downstream compartment having a reduced section and known as the pre-channel, which itself issues into a second downstream compartment called the channel and having an even smaller section, but which is much longer. Therefore the pre-channel serves as a buffer or transition zone regulating the speed of the glass evacuated from the melting compartment, while the channel is equipped with means for conditioning, cooling and chemically and thermally homogenizing the thus discharged glass.

Preferably, the dimensions of said downstream compartment are chosen in such a way with respect to those of the melting/refining compartment that they determine a sufficiently small glass depth to prevent the creation of a convective recirculation of the molten glass towards the melting/refining compartment. The energy economies are thus increased because once the glass has been evacuated from the melting/refining compartment it does not return there to be heated again. Such a design is more particularly described in French patent application 93/13022 filed on Feb. 11, 1993 (corresponds to the copending, commonly assigned, U.S. patent application being filed on this same date and having attorney docket no. 1247-564-3), whose teaching is incorporated into the present application.

Obviously, the melting/refining compartment according to the invention can be advantageously followed by downstream compartments of a completely different design, Such as, e.g., those described in EP-B-264 327.

The aforementioned heat shield is preferably in the form of a drop arch, which defines a change in the height of the laboratory volume. In other words, the ratio between the total height and the glass depth upstream of said shield is smaller than that downstream of said shield, still in the melting/refining compartment. This accelerates the speed of the combustion fumes converging towards the supernatant, vitrifiable materials.

The most immediate application of the furnace according to the invention in supplying molten glass to flat glass forming installations and particular attention is paid to float glass installations.

BRIEF DESCRIPTION OF THE DRAWINGS

Other features and advantages of the invention can be gathered from the following description of a non-limitative embodiment with reference to the attached drawings wherein:

FIG. 4 is a plan view of the complete furnace.

DETAILED DESCRIPTION OF THE PREFERRED EMBODIMENT

Figure 1:
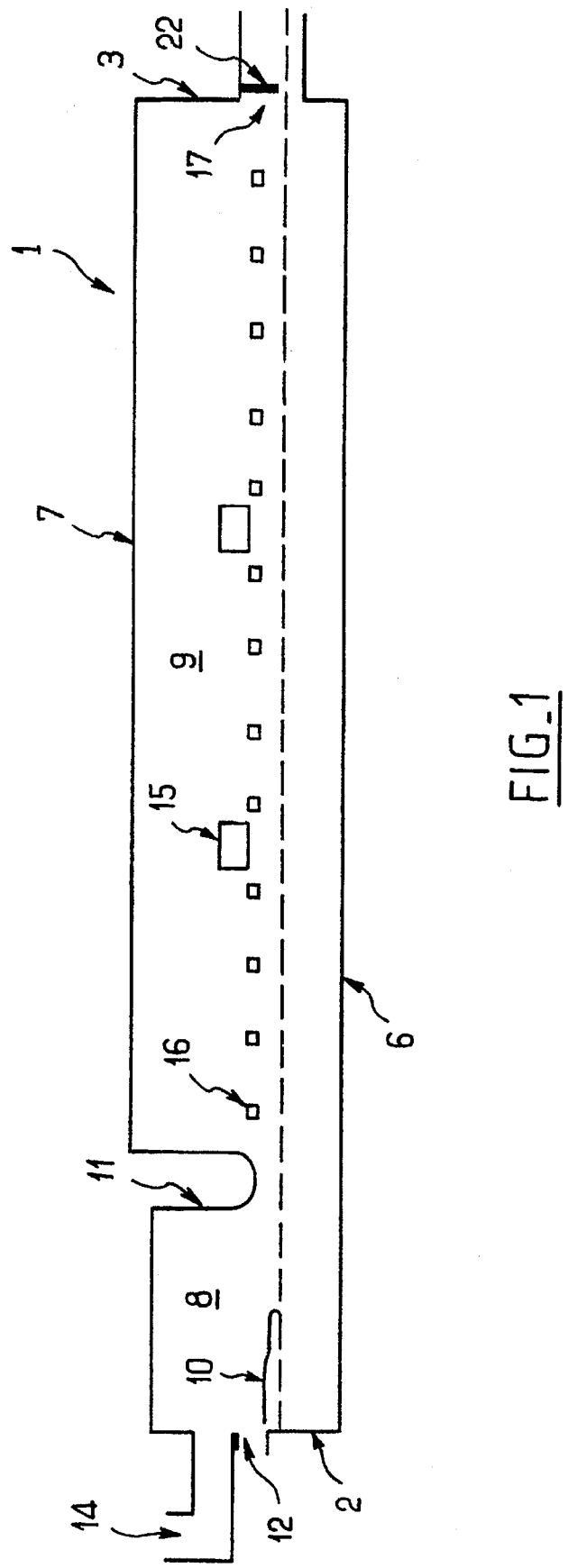
FIG. 1 is a longitudinal sectional view of the melting/refining compartment.
Figure 2:
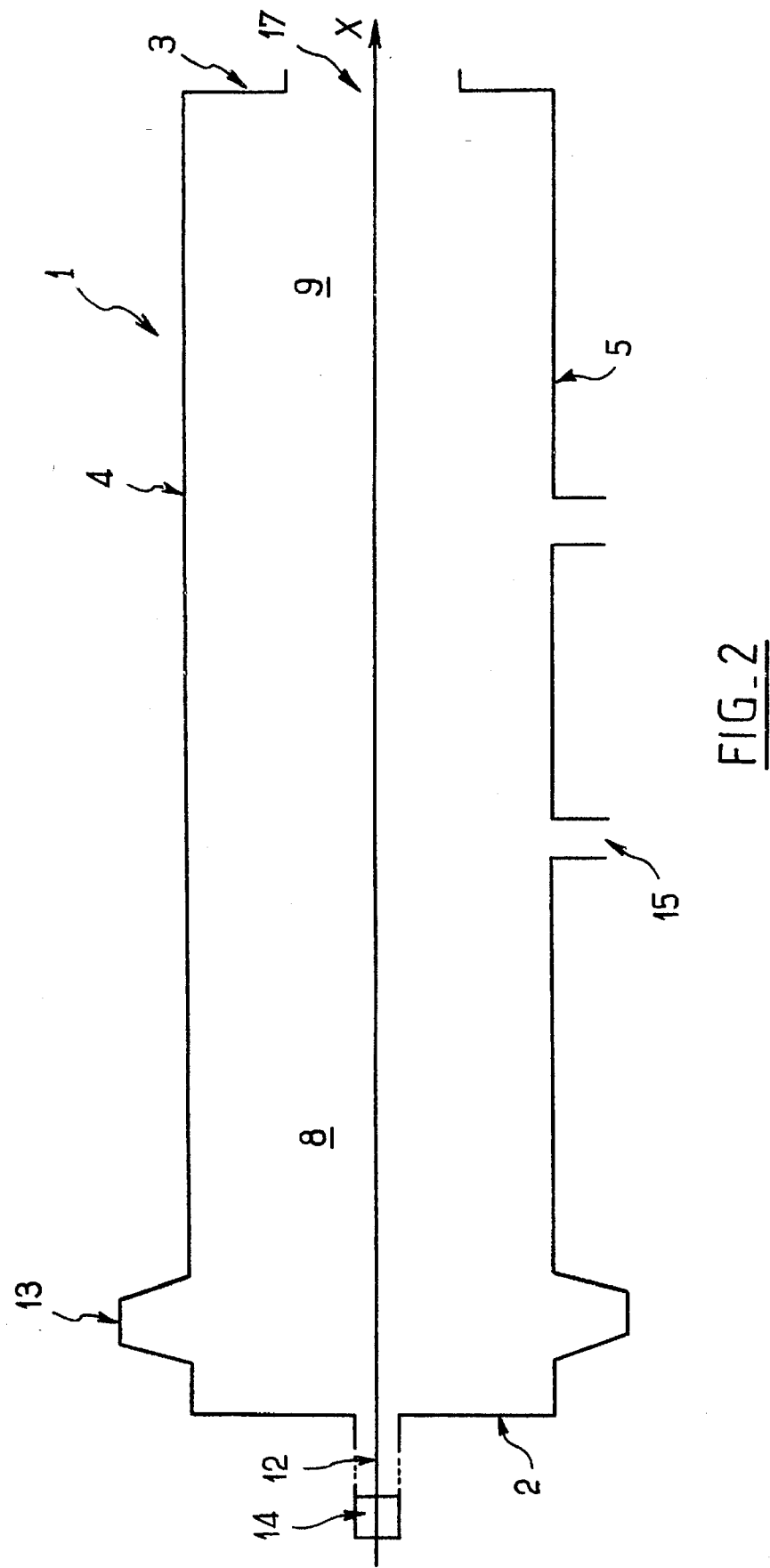
FIG. 2 is a plan view of the melting/refining compartment.
Figure 3:
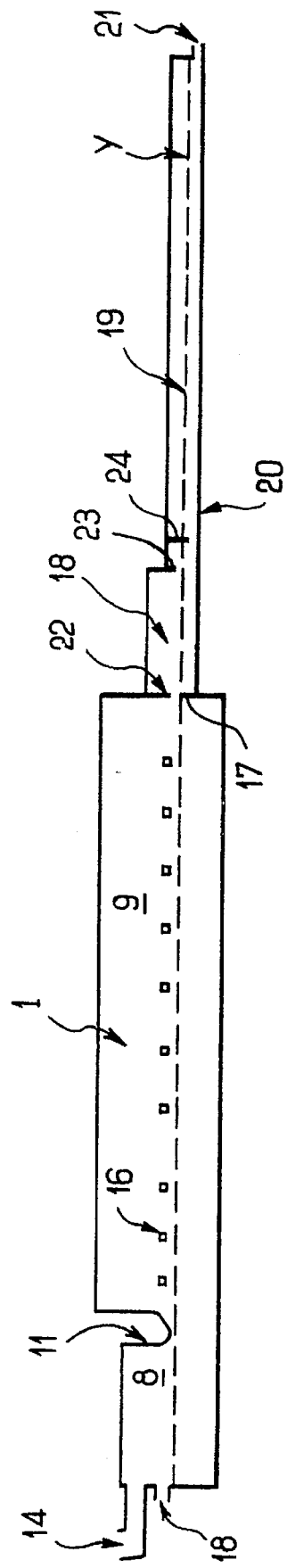
FIG. 3 is a longitudinal sectional view of the overall furnace.

FIGS. 1 and 2 schematically show the glass melting/refining compartment 1 of a furnace according to the present invention. Said compartment is defined by upstream 2 and downstream 3 front walls, side walls 4 and 5, a floor 6 and a top, roof or arch 7, all made from appropriate refractory materials. The floor 6 is flat along a substantially horizontal plane, the walls 2, 3, 4 and 5 are also flat, but along a substantially vertical plane. The top 7 has a curvature transverse to the longitudinal axis X of the compartment 1 (FIG. 2). The molten glass level is indicated in FIGS. 1 and 3 by the horizontal, broken line Y.

This compartment 1 has two main, successive zones 8 and 9 with respect to the longitudinal axis, the first zone 8 being the upstream zone where the vitrifiable materials 10 floating on the surface of the molten glass bath are charged, while the second or downstream zone 9 is where the glass bath is heated and then discharged to the adjacent downstream compartments, which will be described hereinafter relative to FIGS. 3 and 4.

The transition between zones 8 and 9 is delimited by a drop arch 11. The height of the top 7 with respect to the glass level Y is reduced upstream of said arch. The vitrifiable material, also called glassmaking composition, is discharged in the zone 8, either at a front or side thereof.

In FIG. 1, the vitrifiable material supply opening 12 is made in the upstream, front wall 2 facing a conventional, not shown, charging device. In FIG. 2, there are also two symmetrical openings 13 in the side walls 4 and 5 permitting a double composition supply.

No matter whether a lateral or frontal charging type is adopted, openings 14 for the discharge of combustion fumes are provided in the vicinity of the front wall 2. For overall dimensional reasons, it to preferable for the lateral supply openings 13 to be combined with frontal fume discharge openings or vice versa. In the case shown in FIG. 2, the fume discharge opening or openings are therefore made in the upstream, front wall 2.

As a result of the relative positioning of the supply openings and the discharge openings for the fumes, and also due to the presence of the drop arch, a reverse discharge path is imposed on the fumes passing from the zone 9, making them flow upstream towards the not yet melted, vitrifiable material mass 10, which improves the energy efficiency of the furnace.

Once the fumes have been extracted, they are able to supply any heat recovery device or preheating device for the vitrifiable materials, prior to their discharge.

Zone 9 is such longer than zone 8 and is provided with auxiliary fume discharge ducts 15 in the side walls 4 and 5. Walls 4 and 5 also have small openings for rows of oxygen burners 16 which issue into the compartment 1 above the glass level Y. One of the rows is positioned in each of the walls 4 and 5. The accessibility of the walls and the adjustment of the positioning of the burners in the compartment are made possible by the fact that there is a reinforced thermal insulation of the side walls, which makes it possible to reduce the overall thickness thereof. This insulation is formed of planar panels of fibrous materials and/or sprayed insulating concrete.

The burners 16 are preferably positioned equidistantly of one another in each of the two rows. The burners of the two rows are subdivided into subgroups of one or more of pairs of burners. These pairs are constituted by two burners, each belonging to one of the rows, and positioned in a mutually facing manner, so that the burners of each pair are at opposite sides of the furnace and at substantially the same level in the longitudinal direction of the furnace.

As regards the heating power, each subgroup is regulated independently of the others. Therefore it is possible to obtain different temperature profiles along the longitudinal axis of the furnace, at any point and at any time, and in a reliable manner.

It should be noted that the upstream zone 8 has no burners. The fumes penetrating there are able to heat the vitrifiable materials in an optimum manner, and the heat from any burners would be lost with the discharge of the fumes.

The drop arch 11 serving as a barrier between the two zones 8 and 9 serves as a heat shield in order to prevent radiation heating of the zone 8 due to the flames of the burners 16. The reason for this is that, as previously, there is little advantage in reheating the fumes once they have entered the upstream zone 8. The lower part of the arch is sufficiently far from the molten glass level Y not to constitute an obstacle to the circulation of the combustion fumes from zone 9 to zone 8, and instead facilitates their flow towards the supernatant, vitrifiable materials 10.

In the zone 9 of compartment 1 is provided a discharge opening 17 for the molten glass in the downstream, front wall 3. This opening forms a raised sill with respect to the plane of the floor 6, which sill is extended and issues into the adjacent, downstream compartment. The choice of the height of this sill governs the thickness of the molten glass which will pass into said downstream compartment.

An advantage of using continuously operating oxygen burners is that their thermal efficiency is much higher than that of conventional burners while using a reduced gas volume and producing a reduced volume of combustion fumes. Therefore the design of the compartment can be modified, particularly by reducing somewhat the laboratory volume, without prejudice to the operation of the furnace, which leads to economies with respect to the furnace construction materials. Moreover, oxygen burners do not introduce air, particularly nitrogen, into the compartment, which prevents the formation of gases of the $NO_x$ type.

These advantages are guaranteed provided that this particular atmosphere in maintained above the molten glass in the melting/refining compartment 1, and for this purpose there are provided means for bringing about a seal with respect to the gases, which will be described relative to FIGS. 3 and 4 showing the overall furnace.

FIGS. 3 and 4 show the previously described melting/refining compartment 1 followed by a pre-channel 18, in turn followed by a channel 19. The sectional area of the pre-channel 18 is intermediate between that of the melting/refining compartment 1 and that of the channel 19. The bottom wall 20 of said compartments is raised with respect to the floor 6 of the melting/refining compartment 1. The channel 19 ends with a flow spout lip 21, which distributes the molten glass towards a, not shown, forming zone.

The dimensions, particularly the depth, of these two downstream compartments 18 and 19 are chosen so that there in no convective glass recirculation belt from the latter towards the compartment 1, which considerably reduces the heating required in the compartment 1.

There are three sealing means of the aforementioned type, the first being located at the junction between the melting/refining compartment 1 and the pre-channel 18. It in constituted by a suspended shield 22 partly fixed above the molten glass discharge opening 17 and flush with the glass level Y. The second means 23 is located at the junction between the pre-channel 18 and the channel 19 and has the same shape as the first.

The final sealing means is located in the vicinity of the junction between the pre-channel 18 and the channel 19, and specifically in the latter. It consists of a submerged dam 24, which is suspended from the top of the compartment and is partly immersed in the glass. It can also fulfill a drainage function.

The combination of these three means is of an optimum nature for totally sealing the compartment 1 with respect to each of the compartments 18 and 19 succeeding it. It is within the scope of the present invention to combine them in a different way or in a different order, or to use one, two or more such means.

In conclusion, the furnace according to the invention improves the heating system in the melting compartment and reduces its operating and manufacturing costs. A final advantage is an improved control of the atmosphere of the melting compartment, as well as a reduction in the pollution risks.

As stated, the heating system according to the invention can be used for a furnace provided with downstream compartments differing from those shown in FIGS. 3 and 4, and in particular provided with a neck followed by a conditioner.

It is also obvious that the melting/refining compartment can be equipped with any known means for refining and homogenizing the glass or for controlling the convection movements, e.g., all types of stirrers, bubblers, etc. The so-called downstream compartments can, in known manner, also be equipped with any means for conditioning the glass, as well as for draining, cooling and thermally or chemically homogenizing the molten glass.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. Furnace for melting glass, having a compartment for the melting/refining of the glass, said compartment for the melting/refining of the glass comprising:

at least one supply opening to be supplied with vitrifiable materials via a charging device, said opening being positioned in an upstream portion of said melting/refining compartment with respect to a flow direction of the glass in said melting/refining compartment;

a discharge opening in a downstream portion of said melting/refining compartment for discharging the molten glass into at least one successive downstream compartment for leading the molten glass to a forming zone;

a plurality of burners using an oxygen oxidizer, said burners being positioned in said melting/refining compartment and for melting the vitrifiable material;

means for substantially preventing the introduction of air into the melting/refining compartment; and a heat shield extending from a top of said melting/refining compartment and separating said melting/refining compartment into upstream portion into which the vitrifiable materials are charged and a downstream portion having said burners, thereby protecting said upstream portion from radiation from flames from said burners.

2. The furnace according to claim 1, wherein said means for means for substantially preventing the introduction of air into the melting/refining compartment comprises means for sealing the melting/refining compartment with respect to said at least one downstream compartment.

3. The furnace according to claim 1 wherein said burners are distributed in two facing rows extending from opposite lateral side walls of said melting/refining compartment.

4. The furnace according to claim 3 wherein said burners are distributed into a plurality of groups, the heating power of said groups being independently regulatable.

5. The furnace according to claim 1 including auxiliary heating means in the form of electrodes immersed in the molten glass within said melting/refining compartment.

6. The furnace according to claim 1 including reinforced insulating means comprising at least one of panels of fibrous insulating material and sprayed insulating concrete, said reinforced insulating means being applied to at least one of the side walls and the top of said melting/refining compartment.

7. The furnace according to claim 1, wherein a height of the melting/refining compartment measured between a floor and a top thereof is smaller upstream of the heat shield than downstream of said shield.

8. The furnace according to claim 1 wherein said supply openings for the vitrifiable material are located in a upstream part of the melting/refining compartment in at least one of a front wall and side walls of said melting/refining compartment.

9. The furnace according to claim 8, including two of said supply openings symmetrically arranged in opposite ones of said side walls at upstream parts thereof.

10. The furnace according to claim 1 including openings for the discharge of combustion fumes located in said upstream portion of said melting/refining compartment.

11. The furnace according to claim 10, wherein said combustion fumes discharge openings are provided in side walls of the melting/refining compartment.

12. The furnace according to claim 2 wherein said means for sealing include said heat shield and a dam partly submerged in the molten glass.

13. The furnace according to claim 1 wherein said means for sealing are located in at least one of a junction between the melting/refining compartment and an adjacent, downstream compartment, and the junction between two successive downstream compartments.

14. The furnace according to claim 1 wherein said at least one successive downstream compartment comprises a first downstream compartment having a reduced section as compared to said melting/refining compartment, which first downstream compartment issues into a second downstream compartment having a section smaller than said first downstream compartment.

15. The furnace according to claim 1 wherein at least one dimension of the at least one downstream compartment is chosen in such a way that molten glass depth circulating in said at least one downstream compartment does not recirculate to the melting/refining compartment.

16. The furnace according to claim 1, wherein all of the burners of the melting compartment are located at the downstream portion.

* * * * *